US008254903B2

(12) United States Patent
Lee (10) Patent No.: US 8,254,903 B2
(45) Date of Patent: Aug. 28, 2012

(54) SYSTEM AND METHOD FOR REMOTELY OPERATING A WIRELESS DEVICE USING A SERVER AND CLIENT ARCHITECTURE (75) Inventor: Kwang Wee Lee, Singapore (SG)

(73) Assignee: Cassis International Pte. Ltd., Singapore (SG)

( * ) Notice: Subject to any disclaimer, the term of this patent is extended or adjusted under 35 U.S.C. 154(b) by 574 days.

(21) Appl. No.: 12/386,213

(22) Filed: Apr. 14, 2009

(65) Prior Publication Data
US 2010/0197347 A1 Aug. 5, 2010

Related U.S. Application Data (60) Provisional application No. 61/206,454, filed on Jan. 30, 2009, provisional application No. 61/206,453, filed on Jan. 30, 2009, provisional application No. 61/206,427, filed on Jan. 30, 2009, provisional application No. 61/206,797, filed on Feb. 4, 2009.

(51) Int. Cl.
H04M 3/00 (2006.01)
(52) U.S. Cl. ........ 455/419; 455/418; 455/420; 455/558; 455/41.2; 455/557; 455/550.1; 709/203
(58) Field of Classification Search .......... 455/418–420, 455/41.2, 414.1–414.3, 556.1–558, 566; 709/203; 370/352
See application file for complete search history.

(56) References Cited

U.S. PATENT DOCUMENTS

| 6,405,278 | B1 | 6/2002 | Liepe |
| 6,799,155 | B1 | 9/2004 | Lindemann et al. |
| 6,922,548 | B1 * | 7/2005 | Moore et al. ................. 455/41.2 |
| 6,957,179 | B2 | 10/2005 | Debling |
| 7,027,808 | B2 * | 4/2006 | Wesby ........................ 455/419 |
| 7,031,903 | B2 | 4/2006 | Debling |
| 7,363,031 | B1 * | 4/2008 | Aisa ............................. 455/419 |
| 7,406,332 | B1 * | 7/2008 | Gaillard et al. ............... 455/558 |

(Continued)

FOREIGN PATENT DOCUMENTS
CN 1 561 124 1/2005
(Continued)

OTHER PUBLICATIONS

Aug. 11, 2011 PCT International Premliminary Report on Patentability with Written Opinion for PCT/IB2010/000150.

(Continued)

Primary Examiner — Sharad Rampuria
(74) Attorney, Agent, or Firm — James R. Klaiber; PryorCashman LLP (57) ABSTRACT The present disclosure relates to a system and method for remotely operating one or more peripheral devices of a wireless device using a server and client architecture. In one aspect, the system may comprise a wireless device that includes a processor, a memory, a peripheral device, and a server adapted to communicate with the peripheral device; and a removable media device that includes a memory, a processor, and a client adapted to communicate with the server of the wireless device. In another aspect, the method may comprise the steps of emulating a hardware interface on a removable media device; mapping a peripheral device of a wireless device to the interface; mapping a processor of the media device to the peripheral device; wrapping and sending hardware commands from a client of the media device to a server of the wireless device; and executing the commands on the peripheral device.

75 Claims, 5 Drawing Sheets

U.S. PATENT DOCUMENTS

| | | | |
|---|---|---|---|
| 7,636,300 B2 * | 12/2009 | Scott et al. ............... 370/217 |
| 7,869,824 B2 * | 1/2011 | Min ............... 455/550.1 |
| 7,917,167 B1 * | 3/2011 | Fujisaki ............... 455/550.1 |
| 7,933,247 B2 * | 4/2011 | Gidwani ............... 370/332 |
| 7,945,251 B2 * | 5/2011 | Jendbro et al. ............... 455/414.1 |
| 8,028,040 B1 * | 9/2011 | Hobbs et al. ............... 709/219 |
| 8,060,074 B2 * | 11/2011 | Danford et al. ............... 455/419 |
| 2002/0049803 A1 | 4/2002 | Bandhole et al. |
| 2002/0059542 A1 | 5/2002 | Debling |
| 2002/0174337 A1 | 11/2002 | Aihara |
| 2003/0043771 A1 | 3/2003 | Mizutani et al. |
| 2006/0190238 A1 | 8/2006 | Autor et al. |
| 2007/0043550 A1 | 2/2007 | Tzruya |
| 2007/0174033 A1 | 7/2007 | Huang et al. |
| 2007/0178891 A1 * | 8/2007 | Louch et al. ............... 455/420 |
| 2007/0202884 A1 * | 8/2007 | Nykanen et al. ............... 455/455 |
| 2008/0146178 A1 | 6/2008 | Lu et al. |
| 2008/0243465 A1 | 10/2008 | Bohizic |
| 2008/0320181 A1 | 12/2008 | Lauterbach et al. |
| 2009/0036111 A1 * | 2/2009 | Danford et al. ............... 455/419 |
| 2010/0099396 A1 * | 4/2010 | Huq et al. ............... 455/420 |
| 2010/0194667 A1 | 8/2010 | Lee et al. |
| 2010/0197289 A1 | 8/2010 | Lee et al. |
| 2010/0197347 A1 | 8/2010 | Lee |
| 2010/0198994 A1 | 8/2010 | Lee |
| 2010/0199008 A1 | 8/2010 | Lee et al. |

FOREIGN PATENT DOCUMENTS

| | | |
|---|---|---|
| CN | 101132571 | 2/2008 |
| DE | 199 35 888 | 2/2000 |
| DE | 20 2004 020 819 | 5/2006 |
| EP | 0 994 614 | 4/2000 |
| EP | 1 450 516 | 8/2004 |
| EP | 1 460 820 | 9/2004 |
| FR | 2 854 261 | 10/2004 |
| GB | 2 317 246 | 3/1998 |
| GB | 2 450 570 | 12/2008 |
| JP | 2007251630 | 9/2007 |
| WO | WO 2008/011727 | 1/2008 |
| WO | WO 2010/086711 | 8/2010 |
| WO | WO 2010/086712 | 8/2010 |
| WO | WO 2010/086714 | 8/2010 |
| WO | WO 2010/086731 | 8/2010 |

OTHER PUBLICATIONS

Aug. 11, 2011 PCT International Premliminary Report on Patentability with Written Opinion for PCT/IB2010/000177.
Aug. 11, 2011 PCT International Premliminary Report on Patentability with Written Opinion for PCT/IB2010/000151.
Aug. 11, 2011 PCT International Premliminary Report on Patentability with Written Opinion for PCT/IB2010/000153.
Oct. 27, 2011 PCT International Premliminary Report on Patentability with Written Opinion for PCT/IB2010/000684.
U.S. Appl. No. 12/386,211, filed Apr. 14, 2009, Lee et al.
U.S. Appl. No. 12/386,212, filed Apr. 14, 2009, Lee.
U.S. Appl. No. 12/386,208, filed Apr. 14, 2009, Lee et al.
U.S. Appl. No. 12/386,210, filed Apr. 14, 2009, Lee et al.
U.S. Appl. No. 61/206,454, Lee et al.
U.S. Appl. No. 12/386,211, filed Aug. 5, 2010, Lee, et al.
U.S. Appl. No. 51/206,453, Lee.
U.S. Appl. No. 12/386,212, filed Aug. 5, 2010, Lee.
U.S. Appl. No. 61/206,427, Lee, et al.
U.S. Appl. No. 12/386,208, filed Aug. 5, 2010, Lee, et al.
U.S. Appl. No. 61/206,797, Lee.
U.S. Appl. No. 12/386,213, filed Aug. 5, 2010, Lee.
U.S. Appl. No. 12/386,210, filed Aug. 5, 2010, Lee, et al.
U.S. Appl. No. 12/660,723, Lee.
Feb. 16, 2010 Martyn Williams, "SK Telecom Crams Android, Processor Inside a SIM Card", PC World.
Feb. 17, 2010 IDG News Service, "Prototype SIM Card Holds Processor, Memory, Storage and the Android OS", PC World.
Jul. 8, 2010 International Search Report and Written Opinion, for PCT/IB2010/000177.
Jul. 8, 2010 International Search Report and Written Opinion, for PCT/I B2010/000153.
Jul. 8, 2010 International Search Report and Written Opinion, for PCT/IB2010/000684.
Jul. 12, 2010 Invitation to Pay Additional Fees, and Partial International Search, for PCT/IB2010/000150.
Jul. 12, 2010 Invitation to Pay Additional Fees, and Partial International Search, for PCT/IB2010/000151.

* cited by examiner

SYSTEM AND METHOD FOR REMOTELY OPERATING A WIRELESS DEVICE USING A SERVER AND CLIENT ARCHITECTURE

CROSS-REFERENCE TO RELATED APPLICATIONS

This application claims priority to U.S. Provisional Patent Applications Ser. Nos. 61/206,454, 61/206,453, and 61/206,427, filed Jan. 30, 2009, and U.S. Provisional Patent Application Ser. No. 61/206,797, filed Feb. 4, 2009, the disclosures of which are incorporated herein by reference.

FIELD OF THE INVENTION

The present invention relates to a system and method for operating the hardware of a wireless device from a remote media device using a server and client architecture.

BACKGROUND OF THE INVENTION

Current wireless device designs have all the software layers running on the handset main processor with the telephony hardware, radio hardware, Bluetooth, Audio Codec, WiFi, GPRS, display screen, camera hardware, and associated software applications. The application and the runtime environment are dependent on the particular handset hardware architecture. Accordingly, all applications and run-time environments of the device are likely not portable or compatible among devices with different hardware architectures.

SUMMARY OF THE INVENTION

Embodiments of the present invention include a system and method where the application software, runtime environment, telephony frameworks (including those for making calls and short messages), and embedded operating system of a wireless device may be controlled remotely from the device hardware via a high speed interface (including but not limited to USB or MMIC) from a removable media device which may be a system-on-chip in any form factor, including but not limited to an MMC, SD, micro SD, SIM, SAM, or USB dongle form factor.

In one embodiment, the system may comprise a wireless device that includes a processor, a memory, a peripheral device, and a server adapted to communicate with the peripheral device; and a removable media device that includes a memory, a processor, and a client adapted to communicate with the server of the wireless device. In another embodiment of the present invention, the method may comprise emulating a hardware interface on a removable media device; mapping a peripheral device of a wireless device to the interface; mapping a processor of the media device to the peripheral device; wrapping and sending hardware commands from a client of the media device to a server of the wireless device; and executing the commands on the peripheral device.

BRIEF DESCRIPTION OF THE DRAWINGS

Features and other aspects of the embodiments of the present invention are explained in the following description taken in conjunction with the accompanying drawings, wherein.

DETAILED DESCRIPTION

Figure 1:
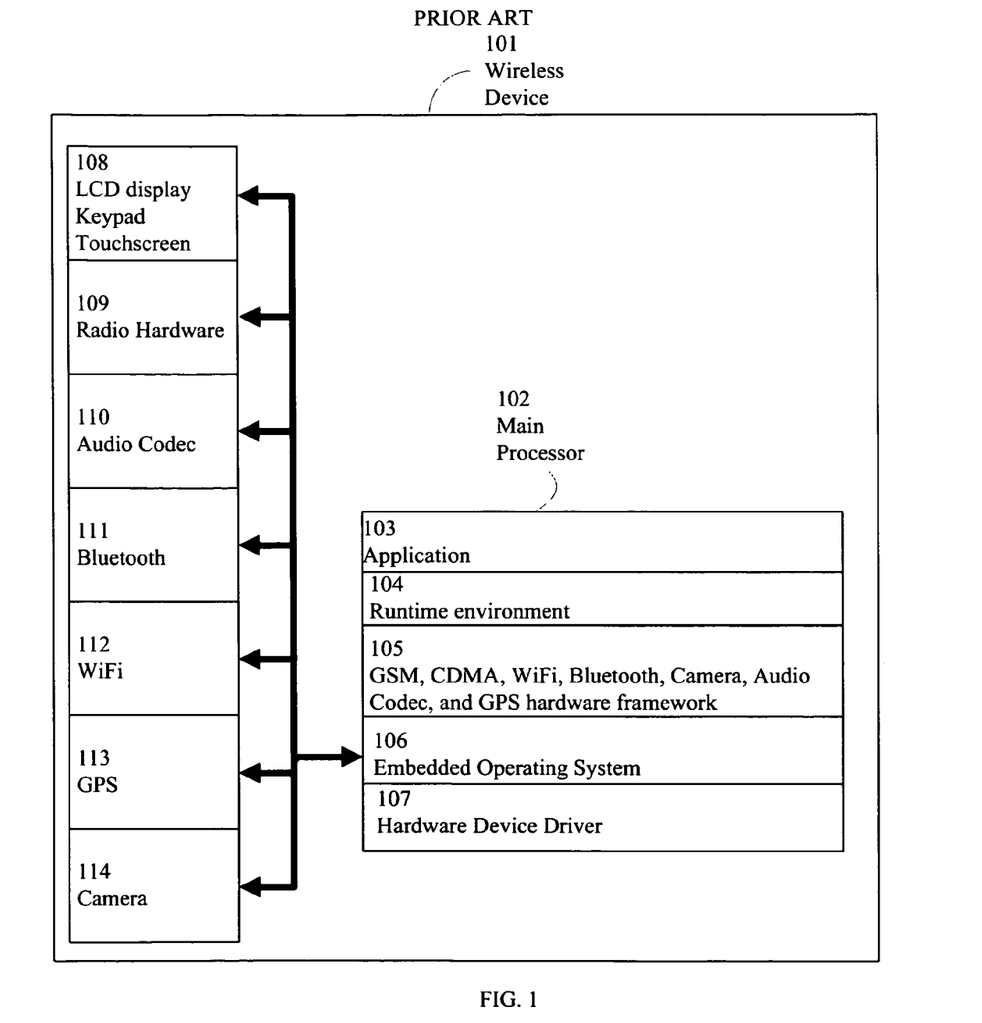
FIG. 1 illustrates a typical architecture for a wireless device with a processor co-located with the interface hardware.

FIG. 1 illustrates a typical architecture for a wireless device with a processor co-located with the interface hardware. As shown in FIG. 1, typical architecture for a wireless device includes a processor 102 located with the rest of the interface hardware in the wireless handset 101. The wireless device hardware may include one or more peripheral devices, including an LCD display, keypad, or touch screen 108; radio hardware 109 (GSM, CDMA, TD-SCDMA, etc.); an audio codec 110; Bluetooth 111; WiFi 112; GPS 113; and a camera 114, each connected to the main processor 102 through a hardware device driver 107. Additionally, the handset 101 may include a software application 103, a runtime environment 104, hardware framework 105, and an embedded operating system kernel 106.

Client-Server Architecture and Design

Figure 2:
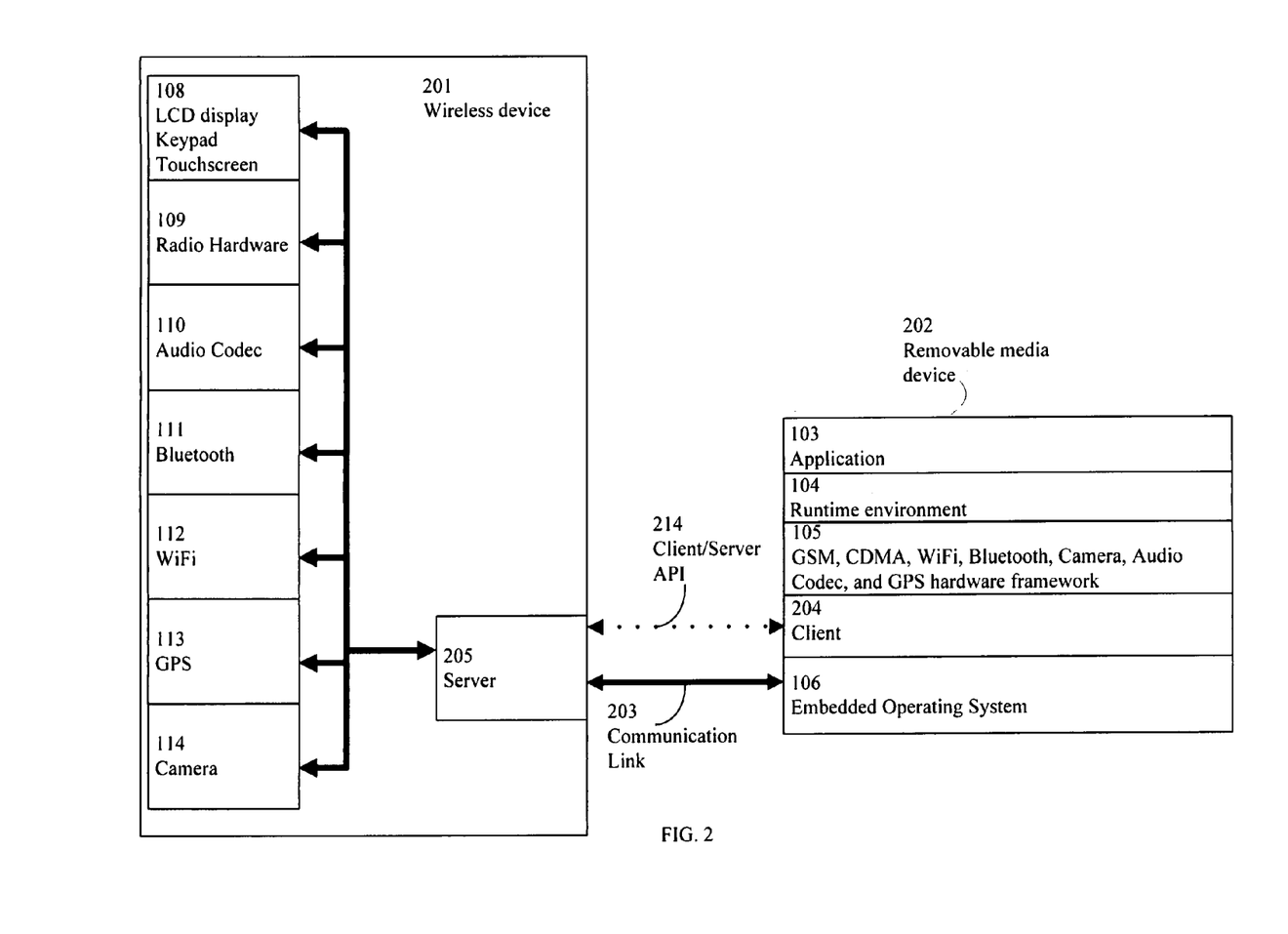
FIG. 2 illustrates a block diagram of an embodiment of the present invention showing a server in a wireless device and a client in a removable media device.

The remaining Figures may be used to illustrate embodiments of the present invention. As shown in FIG. 2, one embodiment of the present invention may include a wireless device 201 having a server 205 controlling peripheral device hardware 107-113, and a removable wireless device 202 that may include a client 204 containing the application 103, runtime environment 104, and embedded operating system 106. The server 205 of the removable media device 202 may be connected to and communicate with the client 204 of the wireless device or handset 201 via a communication link 203.

According to one aspect of the present invention, application 103 in the removable media device 202 may request a hardware resource through the hardware framework 105. In response, the client 204 may request that this resource be allocated to the server 205 on the wireless device 201. The server 205 may then virtually map the device hardware 107-113 on the wireless device 201 for the particular resource to the processor that is located in the removable media device 202.

By using the client/server architecture, the present invention may provide compatibility and increase the portability of a software application from one wireless device to another. The wireless device 201 does not require a sophisticated processor or complex software. Rather, the wireless device 201 may simply include drivers to manage its resources and communicate with the client 204 in the removable media device 202.

In one embodiment shown in FIG. 2, the server 205 and the client 204 may communicate with each other via a client-server application program interface ("API") 214. The API 214 at the server 205 may map the device resources to the applications 103 via the client 204. Whenever the client application 103 requests device resources, the application request is made via the API 114 to the server 205. This eliminates the dependency of the wireless device features and the wireless applications, and with the removable media, brings the additional benefits of application portability and security.

In one aspect, the hardware framework 105 of the removable media device 202 may be a library or collection of functions for a particular one or more of the hardware devices 107-113. Hardware device drivers may also be present on the removable media device 202. This aspect, however, is not necessary. The hardware framework 105 on the removable media device 202 may simply be associated with the client 204. That is, the actual drivers used to implement the hardware devices may be located in the wireless device 201. This configuration is discussed in greater detail below with reference to FIG. 5, which shows a wireless device 201 having hardware device drivers 413-415.

In one aspect, the client 204 of the removable media device in FIG. 2 may be a stub application. A stub may be a small software application. The server 205 of the wireless device 201 may also be a stub application. In another aspect, the communication link 203 may be a simple or high-speed bus, such as a USB. The communication link 203 may also be a wireless connection. Further aspects include but are not limited to USB, SD, micro SD, SIM, SAM, or MMC as a communication link 203.

An OpenMoko Neo Free Runner handset may be used for the wireless device 201, though any hardware configuration is possible. In other aspects, a Samsung S3C2443 development board may be used as the removable media device 202. Linux may be chosen as an open source operating system for the embedded operating system 106 in one embodiment of the present invention. Other operating systems available may include but are not limited or restricted to Win CE, Symbian, or any other embedded operating system. Another aspect may include incorporation of a graphic system (such as, for example, X-Window) that may run on embedded operating system kernel 106. Another aspect may include MatchBox as a runtime environment 104, but any runtime environment may be used, including Android, QT, MontaVista, and Openmoko.

Figure 3:
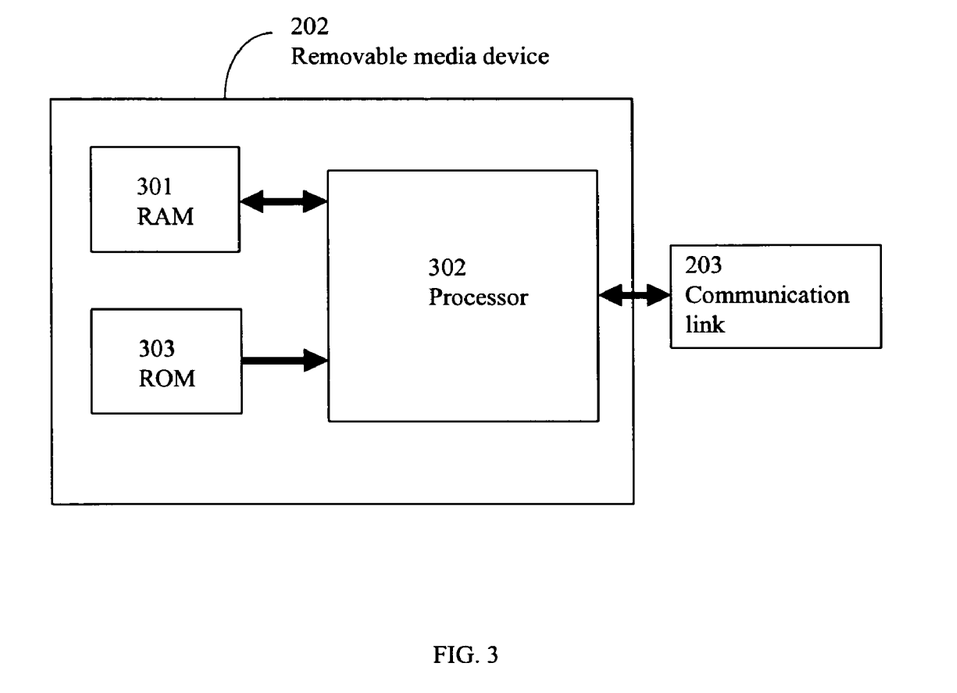
FIG. 3 illustrates a block diagram of the hardware design of the removable media device according to one embodiment of the present invention.

FIG. 3 illustrates a block diagram of the hardware design of the removable media device 202. As shown, removable media device 202 may include RAM 301, ROM 303, and processor 302. Removable media device 202 may be connected to a wireless device (such as wireless device 201 in FIG. 2) via communication link 203. The removable media device 202 may have any form factor including but not limited to MMC, SD, micro SD, SIM, SAM, or USB dongle.

Exchanging Data and Information

Figure 4:
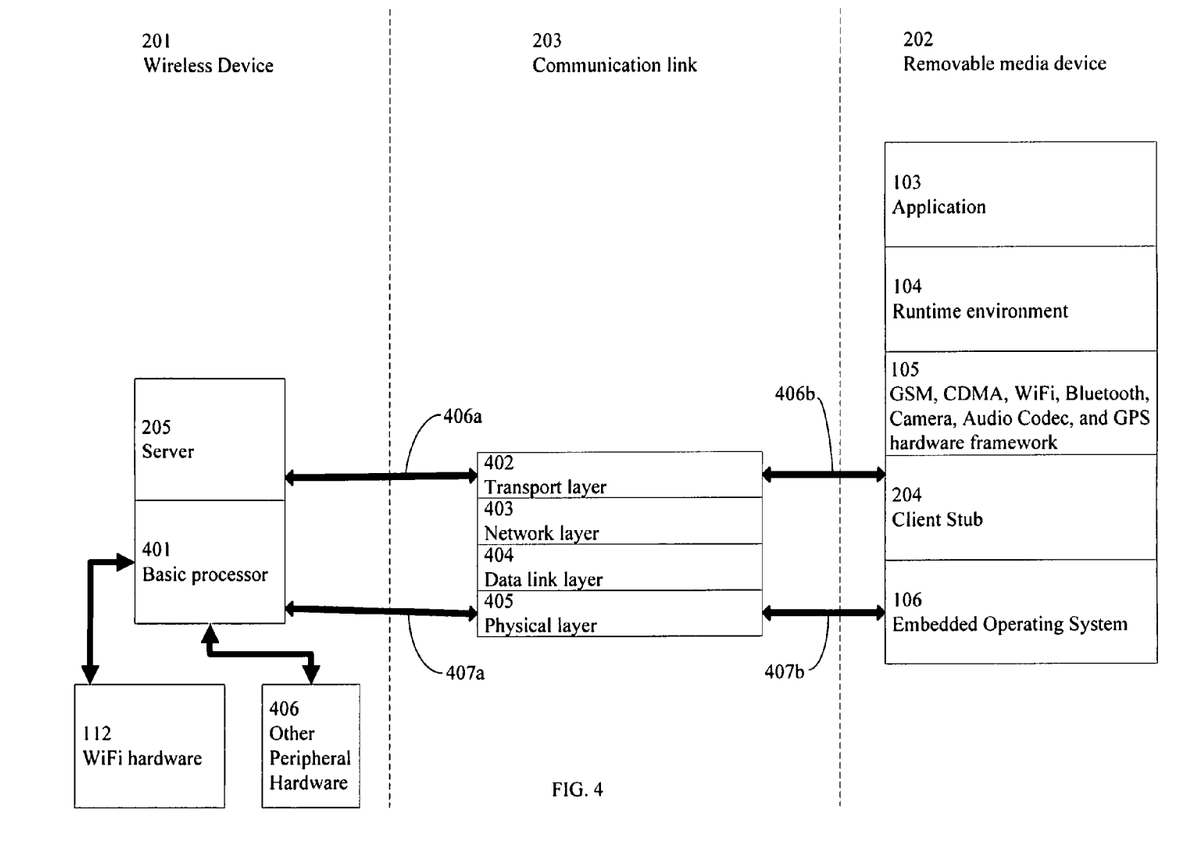
FIG. 4 illustrates a block diagram for the communication between the wireless device and a removable media device according to one embodiment of the present invention.

FIG. 4 shows the logical data exchange between the removable media device 202 and the wireless device 201 according to one embodiment of the present invention. The removable media device 202 and the wireless device 201 may communicate with one another using an Open Systems Interconnection Reference Model architecture, wherein the communication link 203 may include a transport layer 402, network layer 403, a data link layer 404, and a physical layer 405. For example, WiFi hardware 112 or hardware 406 associated with one or more other peripheral devices (e.g., LCD display; keypad or touch screen; radio hardware; an audio codec; Bluetooth; GPS; a camera; etc.) may be mapped to a client stub 204 in the removable media device 202 using a transport layer 402 of the communication link 203. In further aspects, interface 406b of the communication link 203 maps the client stub 204 to the transport layer 402, and interface 406a maps the transport layer 402 to the server 205. In another aspect, interface 407b maps the embedded operating system 106 to the physical layer 405, and interface 407a maps the physical layer 405 to a basic processor 401 of the wireless device 201.

In FIG. 4, the application process may start on the client side. The client application 103 may call a local client stub procedure instead of code implementing the procedure. Stubs may be compiled and linked with the client application 103 during development. Instead of containing code that implements the remote procedure, the client stub code may retrieve the required parameters from the calling application and wrap it as a TCP/IP packet and may deliver them to the communication link 203 that connects to the wireless device 201 containing the server 205.

On the wireless device 201, the server 205 may receive the parameters from the client, and the server 205 may call the server procedure. The server 205 may call the actual procedure on the server 205 with the parameters from the client. The remote procedure may then run, possibly generating output parameters and a return value. When the remote procedure is complete, a similar sequence of steps may return the data to the client stub 204. After the remote procedure returns its data to the server 205, the server may encapsulate output parameters to the format required for transmission back to the client. The server 205 may return the output parameter to the client stub 204 over the communication link 203. The client stub 204 may complete the process by accepting the data over the network and returning it to the calling function from application 103.

In further aspects, each hardware device (i.e., WiFi hardware 112 or other peripheral hardware 406) that is mapped may be assigned to a logical port through which it may communicate. The server 205 on the wireless device 201 may communicate the hardware configuration of a particular hardware device to the client stub 204 on the removable media device 202. The client stub 204 may assign a logical port to each hardware device reported by the server 205. The logical ports may start at 8889 and may decrement the port address for each next hardware device present on the wireless device 201. The client stub 204 may inform the server 205 of the hardware device logical port assignments.

In one aspect in particular, port 8889 may be assigned to map the WiFi hardware 112 from the wireless device 201 to the removable media device 202. When an application 103 or runtime environment 104 in the removable media device 202 requests a WiFi function, such as scanning for an access point, the client stub 204 sends this command via port 8889 to the server 205 in the wireless device 201. The server 205 may then instruct the WiFi hardware 112 to scan and return a list of access points found through the same logical port 8889. The client stub 204 may send the list of access points to the calling application 103 or runtime environment 104.

Accessing Peripheral Devices

Figure 5:
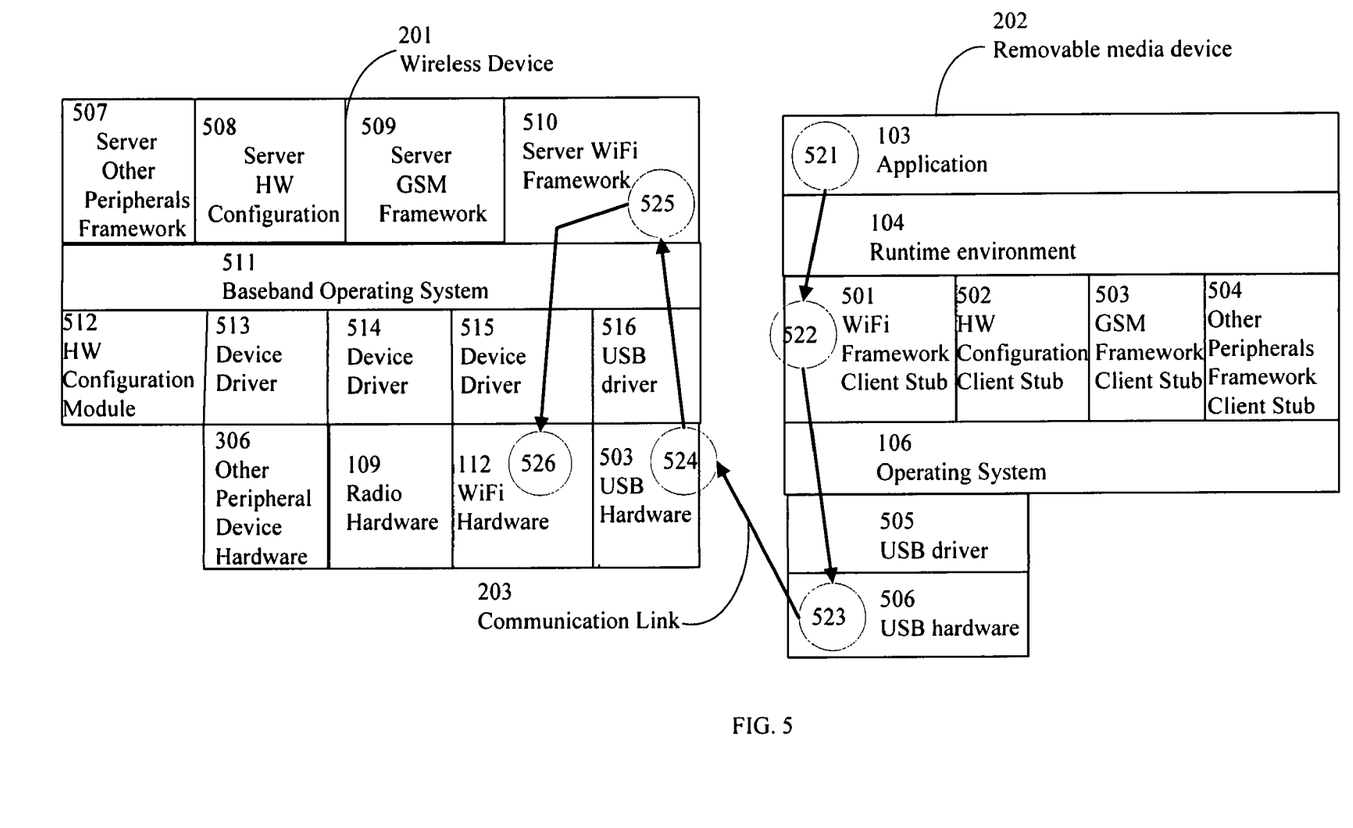
FIG. 5 illustrates a prototype implementation of the client and server according to one embodiment of the present invention.

FIG. 5 illustrates the flow of information from an application 103 that requests access to WiFi hardware 112 to scan for an access point. The information flow is depicted by the arrow in FIG. 5 in the sequence identified by the bubbles numbered 1 through 6. In this embodiment of the present invention, the wireless device 201 may include one or more hardware framework server stub applications 507-510 running on a baseband operating system 511 and hardware devices 306, 109, 112 driven by device drivers 413-415. The wireless device 201 may also include a hardware configuration module 512 for storing the configuration settings of the hardware devices 306, 109, and 112. The media device 202 may include one or more corresponding client stubs 501-504. The wireless device 201 and removable media device 202 may communicate with each other through communication link 203 via USB hardware 503, 506 driven by USB drivers 516, 505.

As shown in step 521, an application 103 may first issue a scan command to the WiFi hardware framework 105. In step 522, instead of the client stub WiFi framework 501 executing the procedures/codes to access the WiFi device hardware drivers—which may not be present on the removable media system—the client stub WiFi framework may encapsulate the parameters (command and data) into a TCP/IP packet and send it to the communication link 203 via the USB hardware 506. The command and data may be stored as the payload in the TCP/IP packet sent over the communication link 203.

Step 523 may involve the removable media device 202, which may be remotely connected to the wireless device 201 via USB CDC RNDIS/ethernet, functioning as though it is physically connected to the wireless device 201 and sending the TCP/IP packet to the wireless device 201 at a certain port number. This may be accomplished using a USB standard endpoint descriptor.

In step 524, the wireless device 201 may receive the packet and send it to the server stub WiFi framework 510 in the baseband processor of the wireless device. Each server hardware framework (e.g., 507-510) corresponding to a particular hardware device may have its own logical port on the TCP/IP network. The logical port may be dynamically assigned during start up. The servers 507-510 may inform the client stubs 501-504 of the hardware configuration present on the wireless device 201 and their corresponding logical port numbers. The ports may be assigned according to hardware type; for example, GSM may be 8889 and WiFi may be 8888.

The server 510 for the WiFi framework on the wireless device 201 may listen to TCP/IP at port number 8888, as shown in step 525. There may be a buffer for each logical port address on a transport layer (such as transport layer 402 shown in FIG. 4). The server 510 may check the buffer of a logical port address to determine if there is any data present. Once the packet is received, it may remove the encapsulation from the packet. For a framework call, the server 510 may implement the framework to call the WiFi hardware 112. A framework may be a library of functions that implement hardware functionality, for instance, having the WiFi hardware 112 scan for an access point.

Finally, in step 526, the command may be received by the WiFi hardware 112 and executed. A result may be returned to the calling application 103 through the reverse order of information flow (i.e., from step 526 to step 525 . . . to step 521). A wireless device 201 may operate with the removable media device 202 as long as the server stub of server 510 may implement the parameters and API of the client stub 501, even if, for example, the configuration of the WiFi hardware 112 is different than the corresponding hardware configuration for the removable media device 202.

The advantages of embodiments of the present invention may include one or more of the following: (1) because the wireless device does not require high processing power, and may include only the server API, there may be significant product development cost savings and/or decreased time to market; (2) wireless applications may be portable from one wireless device to any such device that contains the server API, allowing more freedom for the consumers; and (3) service providers can ensure full portability of the user interface when the consumers change wireless devices because the user interface of the new wireless device can be programmed in the removable media device.

Although illustrative embodiments have been shown and described herein in detail, it should be noted and will be appreciated by those skilled in the art that there may be numerous variations and other embodiments that may be equivalent to those explicitly shown and described. For example, the scope of the present invention is not necessarily limited in all cases to execution of the aforementioned steps in the order discussed. Unless otherwise specifically stated, terms and expressions have been used herein as terms of description, not of limitation. Accordingly, the invention is not to be limited by the specific illustrated and described embodiments (or the terms or expressions used to describe them) but only by the scope of claims.

What is claimed is:

1. A method for operating one or more peripheral devices of a wireless device from a media device having a client stub comprising:
    a. mapping, on the wireless device, a processor of the media device, via a server;
    b. receiving, on a processor of the wireless device, wrapped TCP/IP packets containing hardware commands and client stub data sent from the media device;
    c. unwrapping, on the wireless device, said wrapped TCP/IP packets containing hardware commands;
    d. sending said TCP/IP packets to a server stub framework in the processor of said wireless device; and
    e. executing, by the wireless device, said hardware commands,
    f. scanning for an access point connection, wherein said scanning step is performed by WiFi hardware.

2. The method of claim 1, wherein said server is a stub application.

3. The method of claim 1, further including the step of communicating via the server with a client of the wireless device using a transfer layer of a communication link.

4. The method of 3, further including the step of checking, by the wireless device, a buffer coupled to said transport layer for data stored on said transport layer.

5. The method of claim 1, further including the step of communicating via a processor of the wireless device with an embedded operating system of the media device using a physical layer of a communication link.

6. The method of claim 1, wherein said wrapped packets are received from a client of the media device using a communication link.

7. The method of claim 6, wherein said communication link is a data bus.

8. The method of claim 6, wherein said communication link is wireless.

9. The method of claim 1, further including the step of transmitting, from the server to the media device, one or more results corresponding to said hardware commands.

10. The method of claim 9, wherein said hardware commands include one or more of querying configurable and non-configurable properties of at least one peripheral device of the wireless device, changing configuration settings for at least one peripheral device, checking configuration settings of at least one peripheral device, and sending data to at least one peripheral device for execution on the hardware of the peripheral device.

11. The method of claim 1, wherein said wrapped packets are received from a client of the media device using an API.

12. The method of claim 1, wherein the executing step is performed by at least one of the peripheral devices of the wireless device.

13. The method of claim 1, wherein at least one of said peripheral devices is a display screen, keypad, touch screen, radio, codec, Bluetooth adapter, WiFi adapter, GPS, or camera.

14. The method of claim 1, further including the step of identifying a particular peripheral device for executing said hardware commands according to information contained in said wrapped TCP/IP packets.

15. The method of claim 14, wherein said information corresponds to a logical port number associated with said particular peripheral device.

16. A method for operating one or more peripheral devices of a wireless device from a media device comprising:
- a. emulating, on the media device, a hardware interface for communicating with a runtime environment;
- b. mapping, by a client on the media device, at least one peripheral device of the wireless device to said emulated hardware interface so the media device operates as if directly connected to the peripheral device;
- c. wrapping, by said client on the media device, hardware commands and data sent from a client stub of said media device into TCP/IP packets;
- d. transmitting, by said client on the media device, said wrapped TCP/IP packets containing said hardware commands and said data to the wireless device; and
- e. executing said hardware commands, by the media device, as if the peripheral device of the wireless device is directly connected to the media device;
- f. scanning for an access point connection, wherein said scanning step is performed by WiFi hardware.

17. The method of claim 16, wherein the media device is removably coupled to the wireless device.

18. The method of claim 16, wherein the media device is mechanically connected to the wireless device.

19. The method of claim 16, wherein the media device adheres to a MMC, SD, micro SD, SIM, SAM, or USB dongle form factor.

20. The method of claim 16, wherein the media device is a removable media card.

21. The method of claim 16, wherein the transmitting step includes transmitting said wrapped packets using a communication link.

22. The method of claim 16, wherein the transmitting step includes transmitting said wrapped packets to a server of the wireless device.

23. The method of claim 21, wherein the communication link is a data bus.

24. The method of claim 21, wherein the communication link is wireless.

25. The method of claim 16, wherein said client is a stub application.

26. The method of claim 16, wherein the transmitting step includes transmitting said wrapped packets using an API.

27. The method of claim 16, wherein the emulating step is performed by one or more of the client and a hardware framework corresponding to one or more of the peripheral devices.

28. The method of claim 16, wherein the executing step is performed by a processor of the media device.

29. The method of claim 16, wherein said hardware commands include one or more of querying configurable and non-configurable properties of at least one peripheral device of the wireless device, changing configuration settings for at least one peripheral device, checking configuration settings of at least one peripheral device, and sending data to at least one peripheral device for execution on hardware of the peripheral device.

30. The method of claim 16, wherein at least one of the peripheral devices of the wireless device is a display screen, keypad, touch screen, radio, audio codec, Bluetooth, WiFi adapter, GPS, or camera.

31. The method of claim 28, further including the step of running a hardware framework on said processor, said hardware framework corresponding to one or more of the peripheral devices of the wireless device.

32. The method of claim 31, wherein said hardware framework includes a library of functions adapted to be implemented by at least one of the peripheral devices.

33. The method of claim 16, further including repeating steps b through e for another one of said peripheral devices.

34. The method of claim 16, further including the step of receiving, by the client of the media device, results corresponding to one or more of said hardware commands from the wireless device.

35. The method of claim 16, further including the step of receiving, by the client of the media device, data corresponding to one or more settings for at least one peripheral device of the wireless device.

36. The method of claim 25, wherein said settings include a setting corresponding to one or more of thresholds, min values, max values, character case, language, sensitivity, frequency, channel, frame rate, resolution, color, bit rate, sample size, sampling rate, ISO, and power.

37. The method of claim 16, wherein said client is adapted to communicate with the wireless device using an Open Systems Interconnection Reference Model architecture.

38. The method of claim 21, wherein said communication link includes one or more protocol layers.

39. The method of claim 38, wherein said protocol layers include one or more of a transport layer, network layer, datalink layer, and physical layer.

40. The method of claim 16, wherein the transmitting step includes transmitting said wrapped packets using a transfer layer of a communication link.

41. The method of claim 16, further including the step of communicating via a processor of the wireless device with an embedded operating system of the media device using a physical layer of a communication link.

42. The method of claim 16, wherein the wrapping step further includes wrapping said hardware commands as payload in a TCP/IP packet.

43. The method of claim 16, wherein the transmitting step further includes transmitting said wrapped packets using a USB standard endpoint descriptor to at least one peripheral device associated with a particular logical port number.

44. A method for operating one or more peripheral devices of a wireless device from a media device comprising:
- a. emulating, on the media device, a hardware interface for communicating with a runtime environment;
- b. mapping, by a client of the media device, at least one peripheral device of the wireless device to said emulated hardware interface so the media device operates as if directly connected to the peripheral device;
- c. mapping, by a server of the wireless device, a processor of the media device to the peripheral device so the peripheral device operates as if directly connected to said processor;
- d. sending, by said client, wrapped TCP/IP packets containing hardware commands and data sent from a client stub of the media device to said server of the wireless device;
- e receiving, by said server, said wrapped TCP/IP packets containing hardware commands from said client;
- f. unwrapping, on the wireless device, said wrapped TCP/IP packets containing hardware commands and data;
- g. sending said TCP/IP packets to a server stub WiFi framework in the processor of said wireless device; and
- h. executing, by the wireless device, said hardware commands;
- i. scanning for an access point connection, wherein said scanning step is performed by WiFi hardware.

45. The method of claim 44, wherein said server is a stub application.

46. The method of claim 44, wherein said client is a stub application.

47. The method of claim 44, further including the step of communicating via a processor of the wireless device with an embedded operating system of the media device using a physical layer of a communication link.

48. The method of claim 44, wherein the sending step includes sending said wrapped packets using a communication link.

49. The method of claim 48, wherein said communication link is a data bus.

50. The method of claim 48, wherein said communication link is wireless.

51. The method of claim 44, wherein said hardware commands include one or more of querying configurable and non-configurable properties of at least one peripheral device of the wireless device, changing configuration settings for at least one peripheral device, checking configuration settings of at least one peripheral device, and sending data to at least one peripheral device for execution on hardware of the peripheral device.

52. The method of claim 44, wherein the sending step includes sending said wrapped packets to the client using an API.

53. The method of claim 44, wherein the executing step is performed by at least one of the peripheral devices of the wireless device.

54. The method of claim 53, wherein at least one of said peripheral devices performing the executing step is a display screen, keypad, touch screen, radio, codec, Bluetooth adapter, WiFi adapter, GPS, or camera.

55. The method of claim 44, further including the step of identifying a particular peripheral device for executing said hardware commands according to information contained in said wrapped TCP/IP packets.

56. The method of claim 55, wherein said information corresponds to a logical port number associated with said particular peripheral device.

57. The method of claim 44, wherein the media device is removably coupled to the wireless device.

58. The method of claim 44, wherein the media device is mechanically connected to the wireless device.

59. The method of claim 44, wherein the media device adheres to a MMC, SD, micro SD, SIM, SAM, or USB dongle form factor.

60. The method of claim 44, wherein the media device is a removable media card.

61. The method of claim 44, wherein the emulating step is performed by one or more of the client of the media device and a hardware framework corresponding to at least one peripheral device of the wireless device.

62. The method of claim 44, further including the step of running a hardware framework on a processor of the media device, said hardware framework corresponding to one or more of the peripheral devices of the wireless device.

63. The method of claim 62, wherein said hardware framework includes a library of functions adapted to be implemented by at least one of the peripheral devices.

64. The method of claim 44, further including repeating steps b through g for another one of said peripheral devices.

65. The method of claim 44, further including the step of receiving, by the client of the media device from the server of the wireless device, data corresponding to one or more settings for at least one peripheral device of the wireless device.

66. The method of claim 65, wherein said settings include a setting corresponding to one or more of thresholds, min values, max values, character case, language, sensitivity, frequency, channel, frame rate, resolution, color, bit rate, sample size, sampling rate, ISO, and power.

67. The method of claim 44, wherein the client is adapted to communicate with the wireless device using an Open Systems Interconnection Reference Model architecture.

68. The method of claim 44, wherein said communication link includes one or more protocol layers.

69. The method of claim 68, wherein said protocol layers include one or more of a transport layer, network layer, datalink layer, and physical layer.

70. The method of claim 44, wherein the sending step includes sending said wrapped packets using a transfer layer of a communication link.

71. The method of claim 44, further including the step of checking, by the wireless device, a buffer coupled to said transport layer for data stored on said transport layer, wherein said checking step is performed after step d and before step e.

72. The method of claim 44, further including the step of storing one or more hardware commands as payload in a TCP/IP packet, wherein the storing step is performed after step c and before step d.

73. The method of claim 44, further including assigning a logical port number to at least one of the peripheral devices on the wireless device.

74. The method of claim 73, wherein at least one of said wrapped packets includes a USB standard endpoint descriptor, and wherein the sending step further includes sending said wrapped packet to a particular peripheral device associated with said logical port number.

75. The method of claim 44, further including the step of receiving, by the client of the media device from the server of the wireless device, results corresponding to one or more of the hardware commands.

* * * * *